(12) United States Patent
Rus

(10) Patent No.: US 11,149,452 B2
(45) Date of Patent: *Oct. 19, 2021

(54) FIBERBOARD SURFACE PROTECTION SYSTEM

(71) Applicant: Garland Industries, Inc., Cleveland, OH (US)

(72) Inventor: Melissa Rus, Cleveland, OH (US)

(73) Assignee: GARLAND INDUSTRIES, INC., Cleveland, OH (US)

(*) Notice: Subject to any disclaimer, the term of this patent is extended or adjusted under 35 U.S.C. 154(b) by 144 days.

This patent is subject to a terminal disclaimer.

(21) Appl. No.: 16/196,275

(22) Filed: Nov. 20, 2018

(65) Prior Publication Data

US 2019/0085572 A1  Mar. 21, 2019

Related U.S. Application Data

(62) Division of application No. 15/377,347, filed on Dec. 13, 2016, now abandoned.

(60) Provisional application No. 62/271,752, filed on Dec. 28, 2015.

(51) Int. Cl.
| | | |
|---|---|---|
| *E04G 21/00* | (2006.01) | |
| *B32B 38/00* | (2006.01) | |
| *E04F 15/00* | (2006.01) | |
| *E04F 21/00* | (2006.01) | |
| *E04G 21/30* | (2006.01) | |
| *E04F 15/16* | (2006.01) | |
| *B32B 38/10* | (2006.01) | |
| *E04F 21/165* | (2006.01) | |

(52) U.S. Cl.
CPC .............. *E04G 21/30* (2013.01); *B32B 38/10* (2013.01); *E04F 15/16* (2013.01); *E04F 21/1657* (2013.01)

(58) Field of Classification Search
USPC ......... 156/71, 247, 249, 304.1, 304.3, 304.4
See application file for complete search history.

(56) References Cited

U.S. PATENT DOCUMENTS

| | | |
|---|---|---|
| 184,013 A | 11/1876 | Krickl |
| 1,373,366 A | 3/1921 | Stanwood |
| 2,106,399 A | 1/1938 | Beaumont et al. |
| 2,288,470 A | 6/1942 | Lorraine |
| D167,994 S | 10/1952 | McKay |
| 2,835,937 A | 5/1958 | Hobbs |

(Continued)

FOREIGN PATENT DOCUMENTS

| | | |
|---|---|---|
| CA | 2514664 | 2/2006 |
| CH | 450688 | 1/1968 |

(Continued)

OTHER PUBLICATIONS

European Patent Office, Extended European Search Report in related EP Patent Application No. 17155301.0 (dated Jul. 25, 2017).

(Continued)

*Primary Examiner* — Linda L Gray
(74) *Attorney, Agent, or Firm* — Ulmer & Berne LLP; Brian Turung

(57) ABSTRACT

A paperboard or fiberboard sheet is provided with at least one preapplied adhesive strip used to connect together and an adjacently positioned surface protector to form a dust-proof and/or liquid-proof seal between the two surface protectors.

6 Claims, 6 Drawing Sheets

(56) References Cited

U.S. PATENT DOCUMENTS

| | | |
|---|---|---|
| 3,557,504 A | 1/1971 | Graf |
| 3,669,817 A | 6/1972 | McDevitt |
| 3,703,424 A | 11/1972 | Charnock et al. |
| 3,895,981 A | 7/1975 | Tesch |
| 4,137,356 A | 1/1979 | Shoemaker |
| 4,783,939 A | 11/1988 | Bergmann et al. |
| 4,840,824 A | 6/1989 | Davis |
| 4,985,095 A | 1/1991 | Riddle |
| 4,998,391 A | 3/1991 | Connew |
| 5,051,289 A | 9/1991 | Riddle |
| 5,236,753 A | 8/1993 | Gaggero |
| 5,645,912 A | 7/1997 | Nelson et al. |
| D389,588 S | 1/1998 | Dunk |
| 5,794,391 A | 8/1998 | Howard |
| 5,799,448 A | 9/1998 | Dunk |
| 5,817,399 A | 10/1998 | Kalman |
| 6,318,033 B1 | 11/2001 | Birch et al. |
| 6,640,501 B1 | 11/2003 | Hussey |
| 7,073,297 B2 | 6/2006 | Grinstead |
| 7,493,736 B2 | 2/2009 | Sanders |
| D595,079 S | 6/2009 | Preda |
| 7,823,332 B2 | 11/2010 | Siegel |
| 8,334,041 B2 | 12/2012 | Sweeney et al. |
| 9,091,073 B2 | 7/2015 | Wells |
| 9,121,186 B2 | 9/2015 | Mensah |
| 9,365,385 B2 | 6/2016 | Muxlow |
| D784,048 S | 4/2017 | Ellingson |
| 9,714,513 B2 | 7/2017 | Hamp |
| 9,956,568 B2 | 5/2018 | O'Brien |
| 10,011,368 B1 | 7/2018 | Parks |
| 2003/0170452 A1 | 9/2003 | Hensen |
| 2004/0213937 A1 | 10/2004 | Arthur |
| 2004/0261346 A1 | 12/2004 | Gibney |
| 2008/0020166 A1 | 1/2008 | Esposito |
| 2009/0077901 A1 | 3/2009 | Brooks |
| 2010/0154943 A1 | 6/2010 | Langer |
| 2010/0251627 A1 | 10/2010 | Kay |
| 2010/0263589 A1 | 10/2010 | Dempster |
| 2012/0189810 A1* | 7/2012 | Whitener .............. B05C 11/02 428/141 |
| 2013/0236676 A1 | 9/2013 | Doyle |
| 2014/0224391 A1 | 8/2014 | Muxlow |
| 2014/0325934 A1 | 11/2014 | Eversley et al. |
| 2016/0312484 A1 | 10/2016 | Ruzhin |
| 2017/0183883 A1 | 6/2017 | Rus |
| 2018/0237215 A1 | 12/2018 | Rus |
| 2018/0347205 A1 | 12/2018 | Rus |
| 2018/0347216 A1 | 12/2018 | Rus |
| 2019/0085565 A1 | 3/2019 | Prest |

FOREIGN PATENT DOCUMENTS

| | | |
|---|---|---|
| CN | 20332090 | 12/2013 |
| DE | 2432353 | 1/1975 |
| DE | 2418722 | 4/1975 |
| DE | 102016122906 | 5/2018 |
| EP | 0011468 | 5/1980 |
| EP | 535679 | 4/1993 |
| EP | 1570911 | 9/2005 |
| EP | 2338679 | 6/2011 |
| GB | 2278073 | 11/1994 |
| WO | 2003020439 | 3/2003 |
| WO | 2011146342 | 11/2011 |

OTHER PUBLICATIONS

Computer Translation of CH 450688 (Durst).
Derwent, Abstract CN 108316581 (2018).

\* cited by examiner

FIBERBOARD SURFACE PROTECTION SYSTEM

This application is a divisional of U.S. patent application Ser. No. 15/377,347 filed Dec. 13, 2016, which in turn claims priority on U.S. Provisional Patent Application Ser. No. 62/271,752, filed Dec. 28, 2015, the disclosures of which are incorporated herein by reference.

The present disclosure relates generally to protective coverings, and more particularly to a protective covering for protecting finished work and other surfaces during construction, moving, painting, or other activities, and a method of manufacturing the protective covering.

BACKGROUND OF THE INVENTION

The process of building out an area or constructing a building occurs in many phases. During this process, a number of different types of workers are required and it may be necessary to complete the construction in steps. As a result, frequently contractors damage floors, stairs, countertops, and other finished work in the process of completing other tasks and moving in and out heavy equipment.

During the last stages of house or building construction, and after floor and countertop materials already have been installed, finish work such as painting, caulking, finish carpentry, and appliance and lighting fixture installation is typically done. This finish work can often cause significant damage to plastic laminates, linoleum, hardwood, ceramic tiles, and carpets before the building is finished, sold, or moved into. Heavy tools, caulking and paint buckets, and appliance edges are particularly damaging.

Traditionally, the only protection, if any, given to floors and countertops during the final stages of construction has been a thin fabric drop cloth or a thin plastic sheet such as the 0.002 inch thick self-adhesive plastic sheet. These sheets help protect against paint or caulking splatters and soil on workers' feet, but do not protect against gouges, scrapes, abrasion, or other damage and breakage due to impact of objects or moving of equipment/tools.

Fabric throw rugs or moving van style blankets can be used but these absorb liquids, snag and catch on appliances, and do not protect against sharp and forceful impact. Also, these covers are bulky and heavy to transport and store.

Other products are designed to protect floors or walls independently, but not both at the same time, with one product. These products leave the base of walls and the perimeter of the floor exposed to damage. It is to be appreciated that where separate products are used to protect the floor and the wall, the lower section of walls, including the baseboards, can be easily damaged on job sites. Additionally, present products do not protect from liquid spills occurring at or near the junction between the wall and floor.

In view of the current state of the art, an improved fiberboard sheet was developed as disclosed in U.S. Patent Publication No. US 2014/0224391 and U.S. Design application Ser. No. 29/497,796 (filed Jul. 29, 2014), which are both incorporated herein by reference. Although this fiberboard sheet provides protection to a floor surface when multiple fiberboard sheets are used, the fiberboard sheets can separate from one another and expose the floor between the separated sheets. In order to address this issue, the end edges of adjacent fiberboard sheets are overlapped. However, during use of the fiberboard sheets, the sheets can move relative to one another and allow a space to form between the fiberboard sheets. Also, sawdust, screws, nails, clips, etc. that fall on the top surface of a fiberboard sheet can work its way between the overlapped sheet and onto a floor surface during the use of the fiberboard sheets. Such materials can cause damage to the floor surface once such materials are in contact with the floor surface and workers walk on the fiberboard sheets and cause such materials to be pressed into the floor surface. Furthermore, liquid spills on the fiberboard sheets can seep between the overlapped fiberboard sheets and onto a floor surface and thereby potentially damage the floor surface. Generally, a user must overlap the fiberboard sheets and then get on his/her knees and cut and paste adhesive tape over the overlapped seam of the fiberboard sheets. For many workers, getting up and down on ones knees to tape over overlapped fiberboard sheets is time consuming, can be difficult for some workers, and requires additional materials (such a tape) at the jobsite to complete the installation of the fiberboard sheet over a surface to be protected.

In view of the current state of floor coverings, there is a need for a floor covering that is easy to use, protects a floor surface against sharp and forceful impact, protects the lower section of walls (including the baseboards), and which can be easily connected together.

SUMMARY OF THE INVENTION

The present invention is directed to a paperboard or fiberboard sheet having an adhesive strip positioned on or closely adjacent to one or more edges of the paperboard or fiberboard sheet. The adhesive is a preapplied adhesive strip that includes a removable top protective release liner that, when removed, exposes a top adhesive surface of the adhesive strip. The exposed top adhesive surface of the adhesive strip is designed to bond with a portion of another paperboard or fiberboard sheet that is positioned on the exposed top adhesive surface. The adhesive bond between the two exposed top adhesive surfaces that is formed by the adhesive strip is a dust-proof bond, and can optionally also be a liquid-proof bond. During installation of multiple sheets of paperboard or fiberboard sheet of the present invention, a first paperboard or fiberboard sheet is positioned on a floor surface to be covered. After the first paperboard or fiberboard sheet is positioned on a floor surface, the removable release liner is simply removed from the top adhesive surface of the adhesive strip. An edge of a second paperboard or fiberboard sheet is positioned over and then on the exposed top adhesive surface of the adhesive strip on the first paperboard or fiberboard sheet. Thereafter, the user can simply walk on the top surface of the second paperboard or fiberboard sheet in the area of the top adhesive surface of the adhesive strip on the first paperboard or fiberboard sheet to complete the adhesive bonding of the first and second paperboard or fiberboard sheets. The adhesive bond forms a dust-proof bond between the two paperboard or fiberboard sheets. This process can then be repeated to secure additional paperboard or fiberboard sheets together. For example, when a third paperboard or fiberboard sheet is to be connected to the second paperboard or fiberboard sheet, the removable release liner on the second paperboard or fiber board sheet is simply removed from the top adhesive surface of the adhesive strip. An edge of a third paperboard or fiberboard sheet is positioned over and then on the exposed top adhesive surface of the adhesive strip on the second paperboard or fiberboard sheet. Thereafter, the user can simply walk on the top surface of the third paperboard or fiberboard sheet in the area of the top adhesive surface of the adhesive strip on the second paperboard or fiberboard sheet to complete the adhesive bonding of the second and third paperboard or fiberboard sheets. As can be appreciated, fourth, fifth, etc. paperboard or fiberboard sheets can be connected together if so required. This arrangement eliminates the need for a user to get down on their knees to apply tape over the overlapping edges of two paperboard or fiberboard sheets. The removable release liner can be removed from the adhesive strip prior to, during, or after the paperboard or fiberboard being placed on the floor surface; however, this is not required. The removable liner can also be removed from one paperboard or fiberboard sheet as the other paperboard or fiberboard sheet is being laid over the paperboard or fiberboard sheet. In such an installation method, the user need not bend completely over or get on his/her knees to adhesively connect together two paperboard or fiberboard sheets. The use of the preapplied adhesive strip on the paperboard or fiberboard sheet eliminates the need to apply a separate piece of tape over the overlapping edges of two paperboard or fiberboard sheets and also makes installation of the paperboard or fiberboard sheets faster and easier. The width and thickness of the adhesive strip is non-limiting. Generally, the width of the preapplied adhesive strip is 0.25-5 inches and all values and ranges there between (e.g., 1 inch, 2 inches, 2.5 inches, etc.). The thickness of the adhesive strip is generally less than 0.25 inches. The adhesive strip is generally positioned on one edge or two opposite edges of the paperboard or fiberboard sheet; however, this is not required. As can be appreciated, the adhesive strip can be positioned on two adjacent edges of the paperboard or fiberboard sheet. When two adhesive strips are on a paperboard or fiberboard sheet, the two adhesive strips are positioned on the same surface of the paperboard or fiberboard sheet; however this is not required. The adhesive strip is generally positioned at or within 1-2 inches of the edge of the paperboard or fiberboard sheet.

In another non-limiting aspect of the present invention, the paperboard or fiberboard sheet can optionally include one or more embedded creases, wherein each of the creases can be folded in order to position a portion of the fiberboard sheet horizontally and another portion of the paperboard or fiberboard sheet vertically. The term crease used herein includes scoring or perforating the surface. The paperboard or fiberboard surface protector can provide a quick and easy folding of the paperboard or fiberboard sheet, along a multitude of crease lines, to allow for simultaneous horizontal and vertical protection within a single product. The paperboard or fiberboard surface protector can eliminate the need for two or more separate products and extra steps in the protection process. The paperboard or fiberboard surface protector can create a seamless barrier between a horizontal and a vertical junction of orthogonally adjacent surfaces such as, for example, a floor and a wall extending upwardly therefrom.

The material used to form a majority or the complete composition of the protective surface protector of the present invention is paperboard or fiberboard. As defined herein, fiberboard is a type of engineered wood product that is made out of wood fibers. The general types of fiberboard (in order of increasing density) include particle board, medium-density fiberboard, and hardboard. Plywood is not a type of fiberboard, as it is made of thin sheets of wood, not wood fibers or particles. Cardboard is also not paperboard or fiberboard since it includes a corrugated layer. The one or more creases formed in the paperboard or fiberboard are designed to enable the paperboard or fiberboard to be folded along the crease without causing the paperboard or fiberboard to tear or separate along the crease. This invention is a significant improvement in that paperboard or fiberboard, a very durable material, can be used. In the past, the folding of paperboard or fiberboard resulted in the breakage of the paperboard or fiberboard, thus making it undesirable for a floor protection system. Cardboard has been used in the past since it can be easily folded; however, cardboard is not as dense and durable as fiberboard of the similar thicknesses, thus did not provide for the desired floor protection in many applications. The paperboard or fiberboard is generally a water resistant paperboard or fiberboard; however, this is not required.

In summary, the present invention is directed to a surface protector to protect selected portions of surfaces. The surface protector can be a non-reusable (i.e., one-time-use) surface protector; however, this is not required. The surface protector includes a sheet of foldable or bendable paperboard or fiberboard material having a perimeter, a top surface and a bottom surface, and at least one adhesive strip. The surface protector can be in the form of a roll of surface protector or be formed in individual sheets. When the surface protector is in a roll, the roll is generally 10-200 ft. in length (and all values and ranges therebetween); however, longer lengths can be used. When the surface protector is in a roll, the material and thickness of the surface protector is selected so that the surface protector can be rolled into a roll and unrolled from the roll without damage or creasing the surface protector. When the surface protector is in the form of individual sheets, the surface protector is generally about 2-20 ft. in length (and all values and ranges therebetween); however, longer lengths can be used. The width of the surface protector when in a roll form or in individual sheet form is generally about 1-10 ft. (and all values and ranges therebetween); however, greater widths can be used. The surface protector is generally formed of a material that is water resistant or water impermeable. In one non-limiting configuration, the surface protector is formed of a material that prevents full penetration of water through the thickness of the surface protector for at least about 5 minutes, typically at least about 10 minutes, more typically at least about 30 minutes, even more typically at least about one hour, and still even more typically at least about 12 hours. The one or more adhesive strips on the surface protector can be located only on one side of the surface protector or on both sides of the surface protector. One side of the surface protector can include one adhesive strip or a plurality of adhesive strips. The type of adhesive is non-limiting. The thickness of the adhesive is non-limiting. Generally, each of the adhesive strips includes a releasable release liner; however, this is not required. The releasable release liner (when used) is designed to cover the top surface of the adhesive strip until the adhesive strip is to be used to connect to another surface protector or other object, and then be easily removed from the top surface of the adhesive strip without damage to the adhesive strip. The material and thickness of the releasable release liner is non-limiting. Generally, the releasable release liner is formed of a material that is different from the adhesive strip and the paperboard or fiberboard. Generally, at least one adhesive strip is positioned at or within 2 inches of the side edge of the surface protector; however, this is not required. The width of the adhesive strip is generally about 0.25-8 inches (and all values and ranges therebetween); however, larger widths can be used. Generally, the width of each of the adhesive strip is about 0.5%-10% the width of the surface protector (and all values and ranges therebetween), and more typically about 2-8% the width of the surface protector. The width of the releasable release liner is generally the same or slightly greater than the width of the adhesive strip. Generally, the width of the adhesive strip and releasable release liner are constant along the longitudinal length of the surface protector and generally run parallel to an edge of the surface protector; however, this is not required. The adhesive is selected and formulated such that, when the adhesive is connected to the surface of another surface protector, a water-resistant or waterproof seal is formed between the two surface protectors at the location of the adhesive strip; however, this is not required. The adhesive is selected and formulated such that when the adhesive is connected to the surface of another surface protector, the connection is a permanent connection. Such permanent connection is defined such that when two surface connectors that are connected together by the adhesive strip are forcibly separated from one another, one or more surfaces of the surface protectors are torn or damaged due to the separation of the surface protectors. A non-permanent connection would result in the surface protectors not being torn or damaged due to the separation of the surface protectors. The surface protector can optionally include one or more creases (e.g., 1-20 creases, 2-10 creases, 2-5 creases, 3 creases, etc.) along the length of the surface protector. The number of creases may vary due to the custom needs of users. The one or more creases (when used) are offset a distance inward from the perimeter of the surface protector. Generally, each of the creases are spaced a greater distance from an edge of the surface protector than the adhesive strip; however, this is not required. In one non-limiting configuration, one side of the surface protector includes one or more creases. In another non-limiting configuration, two opposing sides of the surface protector each include one or more creases. The surface protector, when it includes one or more creases, is designed to be folded along the one or more creases, thereby creating a first portion and a second portion. The first portion of the surface protector protects a first surface and the second portion of the surface protector protects a second surface. The first surface is generally orthogonal to the second surface; however, this is not required (e.g., 5-150° and all values and ranges therebetween). When two or more creases are included on the sheet, each crease includes a respective offset from a side of the sheet that is different from another crease; however, this is not required. In one non-limiting arrangement, the sheet includes at least two of the creases that are proximal to one side of the perimeter of the sheet and offset at different positions relative to one side. One or more of the creases (when used) can be perforated and/or water resistant; however, this is not required. The number of adhesive strips may vary slightly due to the custom needs of users.

The invention is also directed to a method of forming the surface protector. The method can include the steps of a) providing a paperboard or fiberboard sheet having a perimeter, and b) applying an adhesive strip at or near at least one edge of the paperboard or fiberboard sheet. The method can also include the steps of a) providing a paperboard or fiberboard sheet having a perimeter, b) applying an adhesive strip at or near at least one edge of the paperboard or fiberboard sheet, c) optionally scoring or pressing the paperboard or fiberboard sheet to include one or more creases aligned generally parallel to at least one side of the sheet, and d) positioning the crease to be offset from the perimeter. When two or more creases are formed, the two creases can be positioned to be offset from the perimeter of the sheet at a different location; however, this is not required. In use, the creased sheet can be folded along at least a first crease thereby creating a first portion and a second portion of the sheet on either side of the first crease; wherein the first portion of the sheet protects a first surface and the second portion of the sheet protects a second surface. A creasing wheel can optionally be used to form the one or more creases in the paperboard or fiberboard. The one or more creases in the paperboard or fiberboard can have a depth from about 5% to about 30% of a depth of the paperboard or fiberboard sheet, typically about 10% to 20% of a depth of the paperboard or fiberboard sheet. In one non-limiting arrangement, the one or more creases in the paperboard or fiberboard includes a depth from about 14.5% of a depth of the paperboard or fiberboard sheet. Generally, the depth of the crease is constant along the length of the crease; however, this is not required. The width of the one or more creases is generally about 0.05-0.5 inches (and all values and ranges therebetween). The one or more creases (when used) are generally positioned about to 18 inches (and all values and ranges therebetween) from the perimeter of the paperboard or fiberboard; however other distances can be used. The one or more creases can be colored to facilitate in the visual location of the crease; however, this is not required.

In one non-limiting object of the present invention, there is provided a paperboard or fiberboard sheet that provides protection to floor and/or wall surfaces.

In another and/or alternative non-limiting object of the present invention, there is provided a paperboard or fiberboard sheet that includes at least one adhesive strip used to connect together an adjacently positioned paperboard or fiberboard sheet.

In still another and/or alternative non-limiting object of the present invention, there is provided a paperboard or fiberboard sheet that includes at least one adhesive strip that includes a releasable release liner.

In yet another and/or alternative non-limiting object of the present invention, there is provided a paperboard or fiberboard sheet that includes at least one adhesive strip used to connect together an adjacently positioned paperboard or fiberboard sheet to form a dust-proof or dust-resistant seal between the two adhesively connected paperboard or fiberboard sheets and, optionally, a liquid-proof or liquid-resistant barrier between the two adhesively connected paperboard or fiberboard sheets.

In still yet another and/or alternative non-limiting object of the present invention, there is provided a paperboard or fiberboard sheet that includes at least one adhesive strip that is a preapplied adhesive strip.

In yet another and/or alternative non-limiting object of the present invention, there is provided a paperboard or fiberboard sheet that includes at least one crease.

In another and/or alternative non-limiting object of the present invention, there is provided a method for forming a paperboard or fiberboard sheet that includes at least one preapplied adhesive strip.

In still another and/or alternative non-limiting object of the present invention, there is provided a paperboard or fiberboard sheet that includes one or more creases that resists tearing or breaking along the crease when folded along the crease.

In still yet another and/or alternative non-limiting object of the present invention, there is provided a method for forming a creased paperboard or fiberboard sheet that provides protection to floor and/or wall surfaces.

In another and/or alternative non-limiting object of the present invention, there is provided a paperboard or fiberboard sheet that includes at least one preapplied adhesive strip that can be easily connected to another a paperboard or fiberboard sheet so as to form a dust-proof or dust-resistant seal between the two adhesively connected paperboard or fiberboard sheets and, optionally, a liquid-proof or liquid-resistant barrier between the two adhesively connected paperboard or fiberboard sheets.

In still another and/or alternative non-limiting object of the present invention, there is provided a paperboard or fiberboard sheet that includes at least one preapplied adhesive strip and at least one crease, and which said paperboard or fiberboard sheet can be easily connected to another a paperboard or fiberboard sheet so as to form a dust-proof or dust-resistant seal between the two adhesively connected paperboard or fiberboard sheets, and optionally a liquid-proof or liquid-resistant barrier between the two adhesively connected paperboard or fiberboard sheets, and which paperboard or fiberboard sheet can be bent along the crease while not damaging the crease to provide protection to floor and/or wall surfaces.

These and other objects and advantages will become apparent to those skilled in the art upon reading and following the description taken together with the accompanying drawings.

BRIEF DESCRIPTION OF THE DRAWINGS

Reference may now be made to the drawings which illustrate various non-limiting embodiments that the invention may take in physical form and in certain parts and arrangement of parts wherein.

DETAILED DESCRIPTION OF THE NON-LIMITING EMBODIMENTS

Figure 1:
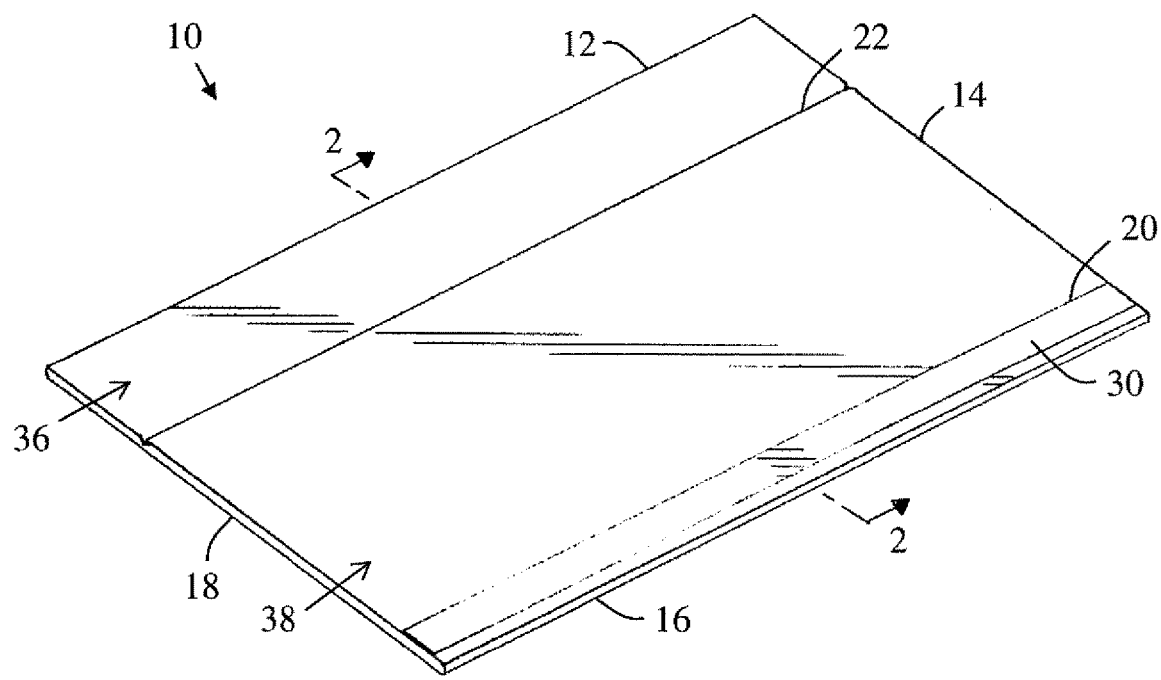
FIG. 1 is a top perspective view of a surface protector in accordance with one non-limiting aspect of the present invention.

Referring now to the drawings, wherein the showings are for the purpose of illustrating various non-limiting embodiments of the invention only and not for the purpose of limiting the same, the present disclosure provides a system and method for surface protection comprising a paperboard or fiberboard surface protector having an adhesive strip which allows for a plurality of surface protectors and/or floor coverings to be connected together. This system thus eliminates the need for additional materials (e.g., tape, glue, etc.) at the jobsite to complete the installation of the surface protector.

Referring now to FIGS. 1-4, there is illustrated a surface protector 10 configured to protect selected portions of surfaces such as, for example, a floor 34 and/or a wall 32. Generally, the surface protector 10 is a sheet of bendable material such as, for example, paperboard or fiberboard material having a perimeter comprising edges 12, 14, 16, 18, a top surface 24 and a bottom surface 26. Additionally, the surface protector 10 includes at least one adhesive strip 20. The adhesive strip 20 is illustrated as being positioned adjacent to an edge 16 along the perimeter of surface protector 10. The preapplied adhesive strip is illustrated as being spaced from edge 16; however, it can be appreciated that the adhesive strip can be positioned such that one side of the adhesive strip extends to edge 16. Generally, the adhesive strip 20 is a preapplied adhesive strip having a top adhesive surface 32.

Figure 2:
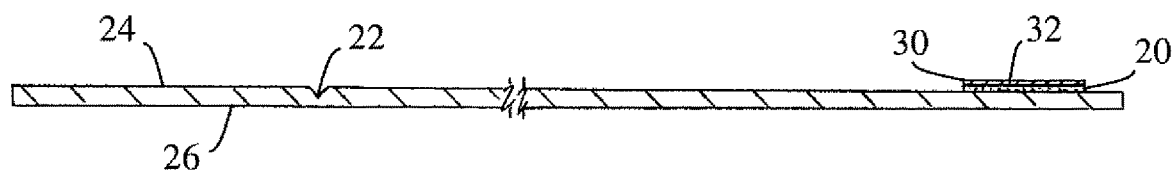
FIG. 2 is a cross-sectional view taken along line 2-2 of FIG. 1.
Figure 3:
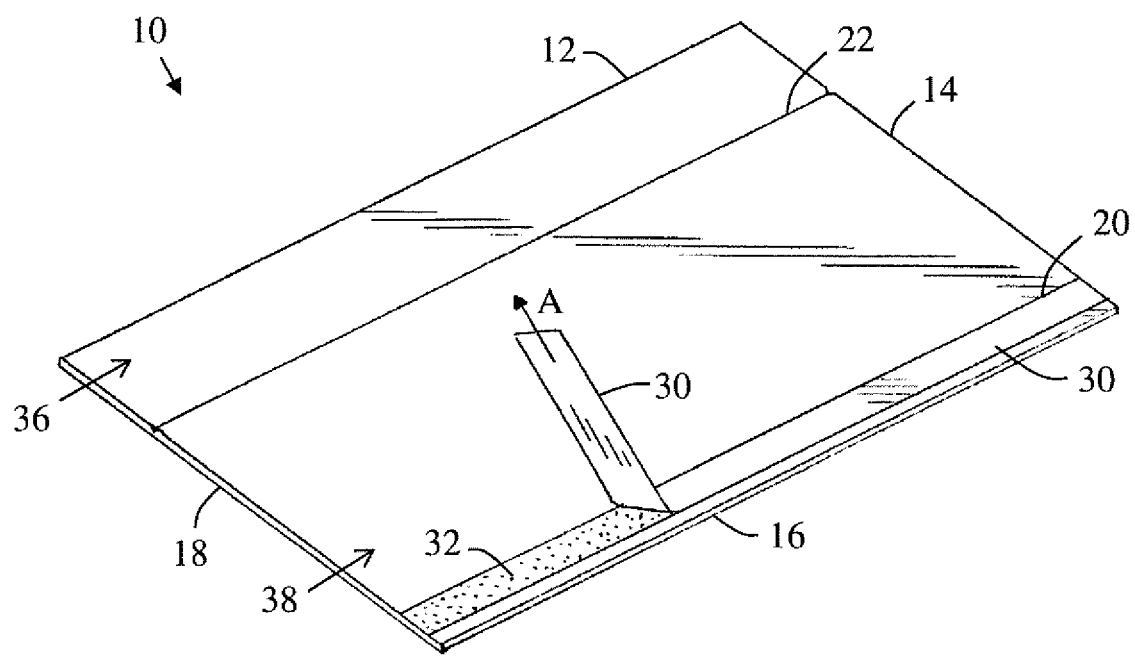
FIG. 3 is a top perspective view of the surface protector of FIG. 1 showing the removal of a removable top protective release liner.

As best illustrated in FIGS. 2-3, the adhesive strip 20 includes a removable top protective release liner 30 that fully covers the top surface of the adhesive strip. When the top protective release liner is removed from the top surface of the adhesive strip, as indicated by arrow A, the top adhesive surface 32 of the adhesive strip 20 is exposed and the adhesive strip is not damaged. The composition of the top adhesive surface 32 is non-limiting; however, it is typically selected to form a permanent connection or bond with another surface protector and/or floor covering. The thickness of the adhesive strip is non-limiting. Generally, the thickness is about 1 mill to 0.1 inch (and all values and ranges therebetween). The adhesive is generally formed of a flexable material such that when the surface protector is rolled into a roll and subsequently unrolled, the adhesive strip is not damaged. The top protective release liner generally has a thickness of about 5 mills to 0.1 inch (and all values and ranges therebetween). Generally, the thickness of the top protective release liner is greater than the thickness of the adhesive strip; however, this is not required. The top protective release liner is also generally formed of a flexable material such that when the surface protector is rolled into a roll and subsequently unrolled, the top protective release liner is not damaged and does not prematurely release from the top surface of the adhesive strip. Generally, the adhesive strip has a generally constant thickness and width along the length of the surface protector. The width of the adhesive strip is generally about 0.25-8 inches and typically about 0.5-3 inches.

It is to be appreciated that a section of a floor can become exposed between separated sheets of traditional floor coverings at job sites, thereby allowing dirt, debris, etc. to fall onto the floor and work their way underneath the floor coverings. The adhesive strip 20 applied to the surface protector 10 of the present invention is designed to prevent this separation of overlapped surface protectors, thereby preventing any relative movement between said surface protectors and preventing any dirt, debris, etc. from falling thereunder. The adhesive strip can also be designed to form a liquid-resistant or waterproof seal between the two connected surface protectors.

Figure 4:
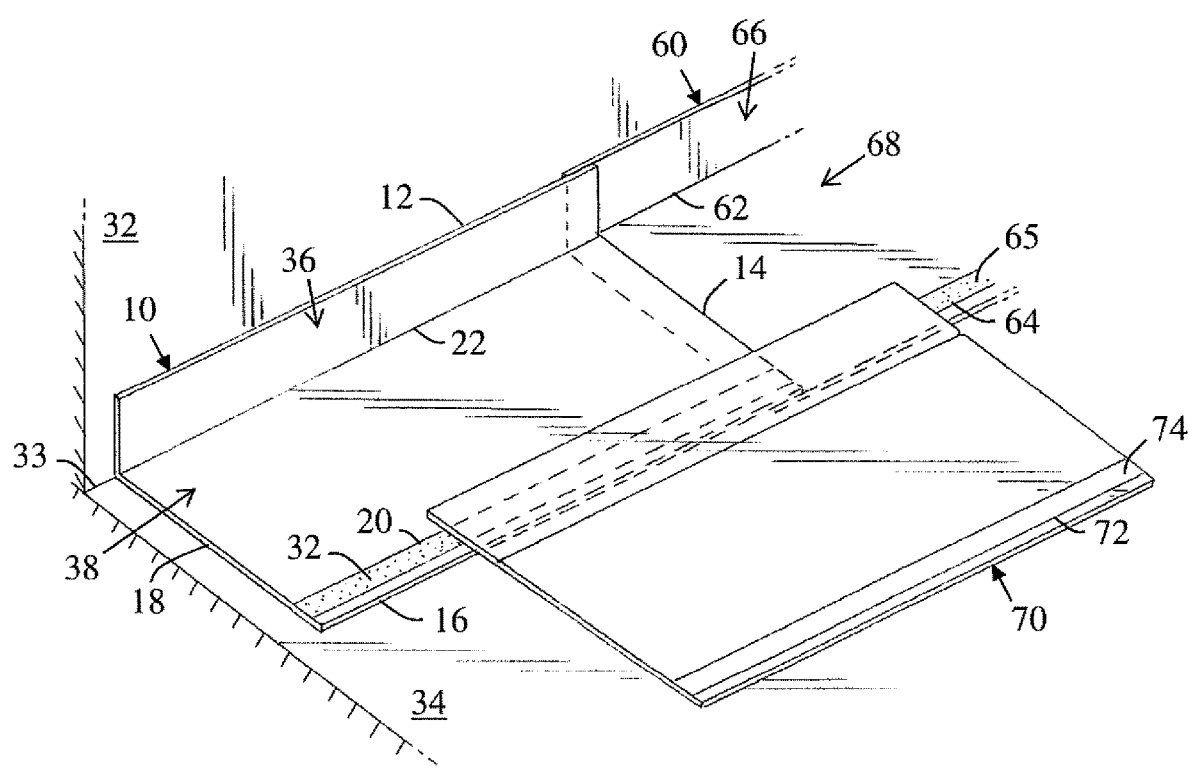
FIG. 4 is a perspective view of a plurality of surface protectors in the use position.
Figure 4A:
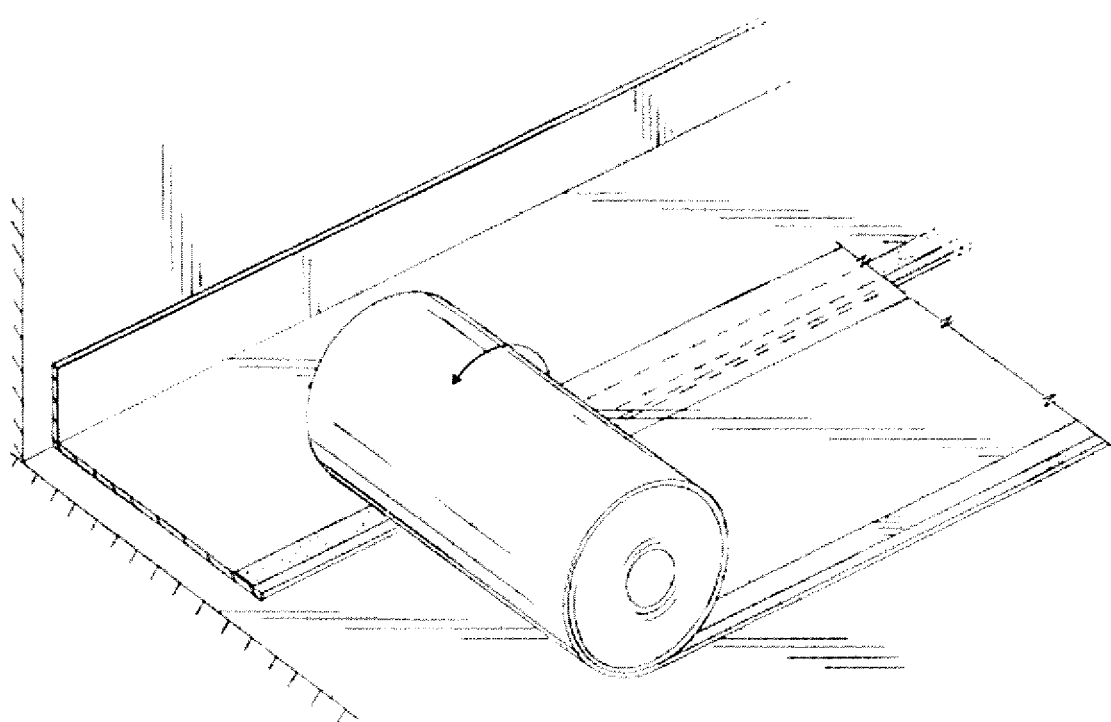
FIG. 4A is a perspective view of a plurality of surface protectors in the use position similar to FIG. 4 wherein the one or both surface protectors are laid from a roll of surface protector; and, FIG. 5 is a top perspective view of a surface protector in accordance with another and/or alternative non-limiting aspect of the present invention.

As best illustrated in FIGS. 4 and 4A, the top adhesive surface 32 of the adhesive strip 20 is capable of forming an adhesive bond with a portion of a second surface protector 70 positioned on or over the exposed top adhesive surface 32 of the adhesive strip 20. The bond formed between the surface protector 10 and the surface protector 70 can be a dust-proof bond. Furthermore, the bond formed between the surface protector 10 and the surface protector 70 can be a liquid-proof bond. In combination with the water-resistant nature of the paperboard or fiberboard material of the surface protector 10, there is provided a substantially dust-proof and liquid-proof surface protection system. Generally, the adhesive bond formed between two surface protectors is designed to be a permanent bond. As such, breaking of the adhesive bond (i.e., separating the two connected surface protectors) will lead to damage to one or both of the surface protectors connected by the adhesive bond. Typically, when the two surface protectors are separated, a layer of fiberboard material is left behind on the top adhesive surface of the adhesive strip; however, this is not required. Additionally, breaking of the adhesive bond can compromise the liquid-proof and/or dust-proof seal created by the adhesive bond.

In current floor protection systems, a user must get on his/her knees and cut and paste adhesive tape over the seams between adjacent floor coverings. Such a process is time consuming, can be difficult and painful for individuals that have arthritis or bad knees and joints, and a proper connection or seal may not be formed between the adjacent floor coverings. The present invention provides a surface protector floor covering that is easy to use, which is capable of protecting a surface (e.g., floor 34) against sharp and forceful impact, and which can be easily connected together.

Any number of adhesive strips 20 can be positioned along the surface protector 10 such that the adhesive strips generally are aligned with, and offset from, a side 12, 14, 16, 18 of the surface protector. The different spacing and positioning arrangements of the adhesive strips 20 relative to a side of the surface protector allows for custom connecting to ensure adequate protection for a selected portion of a surface to be protected by the surface protector. It can be appreciated that any number of surface protectors can be utilized in conjunction with one another wherein adjacent surface protectors are overlapped, and an adhesive bond is formed between top and bottom surfaces of said adjacent surface protectors. The surface protectors can optionally be used to completely cover a floor surface. As such, during job site operations, relative movement between adjacent surface protectors is minimized or eliminated by the adhesive bond formed between said adjacent surface protectors.

Figure 3A:
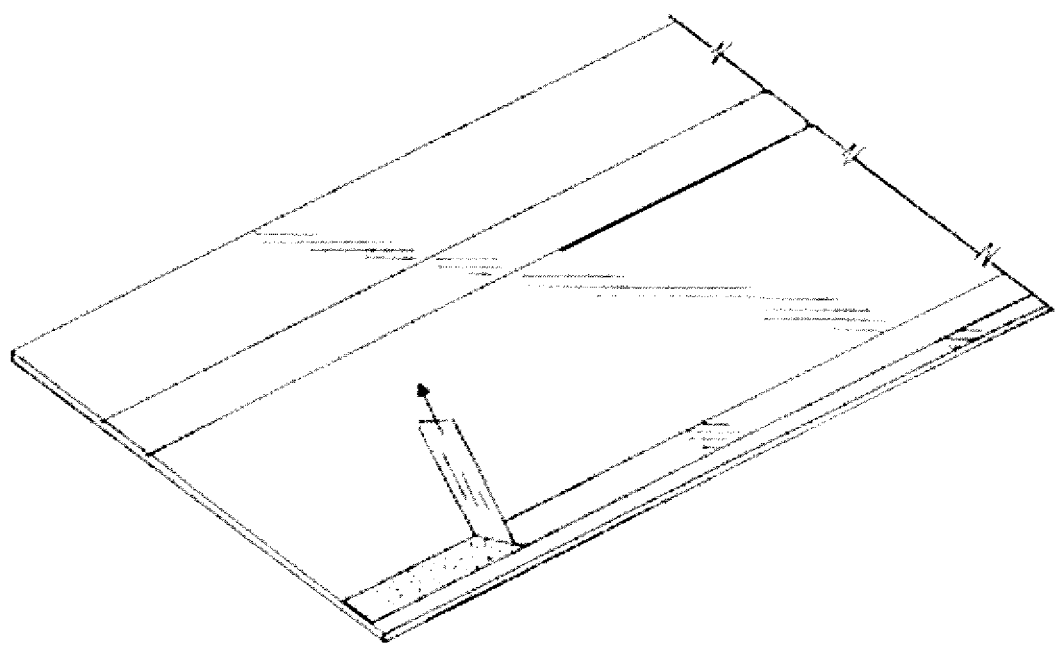
FIG. 3A is a top perspective view of a surface protector similar to FIG. 3 showing a surface protector with a plurality of creases.

As illustrated in FIGS. 1-3, the surface protector 10 can optionally include at least one crease 22 offset a distance inward from an edge such as, for example, edge 12 of the surface protector 10. As such, the surface protector 10 can be folded along the at least one crease 22 thereby creating a first portion 36 and a second portion 38. The first portion 36 of the surface protector 10 is capable of protecting a first surface (e.g., wall 32) while the second portion 38 of surface protector 10 is capable of protecting a second surface (e.g., floor 34) as illustrated in FIGS. 4 and 4A. Generally, the at least one crease 22 is designed to be water resistant when in the bent and non-bent state. As illustrated in FIG. 3A, the surface protector can include a plurality of creases. As illustrated in FIG. 3A, two creases are spaced apart from one another and run generally parallel to one another along the longitudinal length of the surface protector. As can be appreciated, one or more creases can be located on opposite sides of the surface protector such that one crease is located closer to edge 12 than edge 16 and another crease is located closer to edge 16 and to edge 12; however, this is not required. When one crease is located closer to edge 16 and to edge 12, and the adhesive strip is also located closer to edge 16 and to edge 12, such crease is generally located a greater distance from edge 16 than the adhesive strip.

It is to be appreciated that the lower section of walls 32 as illustrated in FIGS. 4 and 4A, including the baseboard (not shown), can be easily damaged at job sites. The creases 22 of the surface protector 10 are designed to enable the surface protector to protect both the floor 34 and the lower section of the wall 32 at the same time, with a single piece of material. More specifically, the surface protector 10 is designed to prevent damage at or near the junction 33 between the floor 34 and the wall 32.

The surface protector 10 of the present invention can be manufactured as a roll of material; however, this is not required. As such, the end user can create sheets of foldable material of desired length to cover a selected surface. Generally, during manufacturing, the adhesive strip 20 is applied along and/or parallel to the lengthwise edges of the roll of material; however, this is not required.

Figure 5:
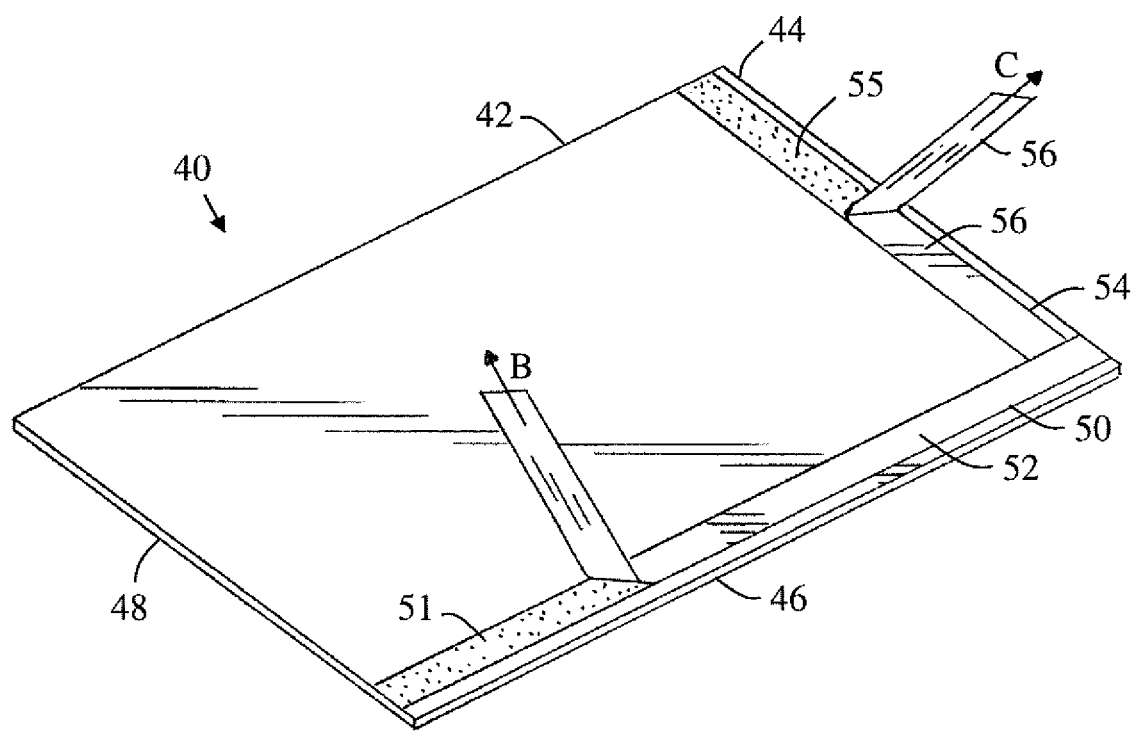

The surface protector can include any number of adhesive strips. With reference now to FIG. 5, there is provided a perspective illustration of a surface protector 40 comprising side edges 42, 44, 46, 48. Adhesive strips 50, 54 are illustrated as being located on the same (i.e., top) surface of the surface protector. When the removable protective release liner 52 is removed from the adhesive strip 50, as indicated by arrow B, the top adhesive surface 51 of adhesive strip 50 is exposed. Similarly, when the removable protective release liner 56 is removed from the adhesive strip 54, as indicated by the arrow C, the top adhesive surface 55 of adhesive strip 54 is exposed. As can be appreciated, one, two or more edges of the surface protector can include adhesive strips. In such an arrangement, a liquid-proof and/or dust-proof adhesive bond can be formed at or near any edge along the perimeter of the surface protector of the present invention. This would be particularly useful in applications where a large surface is to be covered, such as, for example, the floor of a warehouse.

In use, the surface protector 10 can be unrolled as illustrated in FIG. 4A and positioned on a surface (e.g., floor 34, wall 32) to be covered and/or protected. The surface protector 10 can optionally be folded along crease 22 thereby forming a first portion 36 for covering a portion of the wall 32 and a second portion 38 for covering a portion of the floor 34. When the surface is to be used to protect both a wall and a floor surface, the surface protector 10 is positioned such that crease 22 is positioned at or near the junction 33 between the floor 34 and wall 32. The removable top protective release liner 30 can be removed from the top adhesive surface 32 of the adhesive strip 20, thereby exposing the top adhesive surface 32 of the adhesive strip 20 on the surface protector 10. A second surface protector 70 (see FIGS. 4 and 4A) can then be provided, unrolled and subsequently positioned such that the second surface protector 70 at least partially covers the exposed top adhesive surface 32 of the adhesive strip 20 of the surface protector 10. Generally, the second surface protector 70 is overlapped such that the overlapping portion of the second surface protector 70 at least partially covers the adhesive surface 20. A pressure such as, for example, the weight of a person walking on the surface protector, moving or rolling a roller on the surface protector, moving a heavy device (e.g., a device weighing 10 lbs. or more) on the surface protector, etc., can then be applied to the top surface of the surface protector 70 in the area of the adhesive strip 20 on the top surface 24 of the surface protector 10, thereby completing the adhesive bonding between the surface protector 10 and surface protector 70. This process can then be repeated to secure additional surface protectors together.

As illustrated in FIG. 4, a plurality of surface protectors 10, 60, 70 can be used to protect selections of surfaces (e.g., floor 34 and wall 32) to be protected. As illustrated in FIG. 4, surface protectors 10, 60 can be folded along creases 22, 62, respectively, and positioned such that creases 22, 62 are positioned at or near the junction 33 between the floor 34 and the wall 32. As such, a first portion 36 of surface protector 10 can cover a portion of the wall 32 and a second portion 38 of surface protector 10 can cover a portion of the floor 34. Similarly, a first portion 66 of surface protector 60 can cover a portion of the wall 32 and a second portion 68 of surface protector 60 can cover a portion of the floor 34. Surface protector 10 overlaps surface protector 60. The removable protective release liners (not shown) can be removed from adhesive strips 20, 64, thereby exposing the top adhesive surfaces 32, 65, respectively. Another surface protector 70 can then be positioned over the exposed top adhesive surfaces 32, 65 of surface protectors 10, 60, respectively. As illustrated in FIG. 4, if surface protector 70 is the last surface protector to be added for protection of the selected surface, the removable protective release liner 74 is typically left in place over adhesive strip 72, thereby preventing exposure of the covered top adhesive material (not shown) of adhesive strip 72. At any point during installation, a pressure such as, for example, the weight of a person walking on the surface protector, can then be applied to the top surface of the surface protectors 10, 60, 70 in the area of the adhesive strips 20, 64, thereby completing the adhesive bonding between the surface protectors 10, 60, 70. This process can then be repeated to secure additional surface protectors together.

Alternatively, the surface protector 70 can be provided, unrolled and positioned at least partially over the surface protector 10 prior to the removal of the removable top protective release liner 30 from the top adhesive surface 32 of the adhesive strip 20 of the surface protector 10. In such a method of operation, the amount of dust, debris, etc. at the jobsite which sticks to the top adhesive surface 32 of the adhesive strip 20 before the second surface protector is applied can be minimized and/or prevented. As can be appreciated, this method of operation can be particularly useful in job operations having high dust, dirt, and/or debris production.

The adhesive bond formed between the surface protector 70 and the surface protector 10 can be a dust-proof bond. Additionally, the adhesive bond formed between the surface protector 70 and the surface protector 10 can be a liquid-proof bond.

It is to be appreciated that the surface protector 10 of the present invention can be used in conjunction with existing types of surface protectors and/or floor coverings (e.g., plastic sheets, cardboard, fiberboard, cloth, etc.) for the purpose of protecting selected portions of surfaces.

It is also to be appreciated that a plurality of surface protectors 10 can be used to completely cover the floor and at least a lower portion of one or more walls at a job site.

It will be appreciated that variants of the above-disclosed and other features and functions, or alternatives thereof, may be combined into many other different systems or applications. Various presently unforeseen or unanticipated alternatives, modifications, variations or improvements therein may be subsequently made by those skilled in the art which are also intended to be encompassed by the following claims.

What is claimed:

1. A method for providing temporary protection to at least a portion of a top surface of a walkable surface, wherein the method comprises:

providing a first surface protector consisting essentially of a first single sheet of bendable water-resistant material and a single preapplied first adhesive strip; said first single sheet formed of paperboard or fiberboard; said first single sheet having a perimeter edge, a top surface, and a bottom surface; said perimeter edge formed of a front edge, a back edge, a first side edge, and a second side edge; said first single sheet having a first preformed crease that is offset a distance inward from the first side edge and said second side edge of said first single sheet; said first preformed crease is formed on said top surface of said first single sheet; said first preformed crease forms a reduced thickness in said first single sheet prior to said first single sheet being folded along said first preformed crease; said first single sheet configured to be foldable along said first preformed crease to thereby create a first portion and a second portion without damaging said first single sheet and without compromising the water-resistant properties of said first single sheet along said first preformed crease; said first preformed crease configured to be water-resistant both prior to and after said first single sheet is folded along said first preformed crease; said first single sheet having a second preformed crease that is offset a distance inward from the first side edge and said second side edge of said first single sheet; said second preformed crease spaced from said first preformed crease; said second preformed crease positioned parallel to said first preformed crease; said second preformed crease forming a reduced thickness in said first single sheet prior to said first single sheet being folded along said second preformed crease; said first single sheet configured to be foldable along said second preformed crease to thereby create a third portion without damaging said first single sheet and without compromising the water-resistant properties of said first single sheet along said second preformed crease; said third portion positioned adjacent to said second portion when said first single sheet is folded along said second preformed crease; said third portion positioned between said first portion and second portion when said first single sheet is folded along said first preformed crease and said second preformed crease; said second preformed crease configured to be water-resistant both prior to and after said first single sheet is folded along said second preformed crease; said first preformed crease positioned closer to said first side edge than to said second side edge; said second preformed crease positioned closer to said first side edge than to said second side edge; said first preformed crease positioned closer to said first side edge than said second preformed crease; said first adhesive strip spaced from first side edge and said second side edge of said first single sheet; said first adhesive strip attached to said bottom surface of said first single sheet; said first adhesive strip having a top adhesive surface; said first adhesive strip running parallel to said first side edge and said second side edge; said first adhesive strip positioned closer to said second side edge than to said first side edge; said first adhesive strip positioned between said second side edge and said second preformed crease; said first adhesive strip including a removable top protective release liner that, when removed, exposes said top adhesive surface of said first adhesive strip;

placing said first surface protector on said walkable surface such that i) at least a portion of said bottom surface of said first surface protector is positioned over said top surface of said walkable surface, and ii) said first adhesive strip is positioned over said top surface of said walkable surface;

bending said first surface protector along said first crease such that a) said second portion is positioned over at least a portion of said top surface of said walkable surface, and b) said first portion is positioned over at least a portion of a side surface that is adjacent to and is positioned non-parallel to said top surface of said walkable surface;

removing said removable top protective release liner to expose said top adhesive surface of said first adhesive strip; and, securing said top adhesive surface of said first adhesive strip to said top surface of said walkable surface to thereby secure said first surface protector to said top surface of said walkable surface.

2. The method as defined in claim 1, further including the steps of:

providing a second surface protector, said second surface protector having a top surface and a bottom surface;

positioning said second surface protector on at least a portion of said walkable surface such that a portion of said bottom surface of said second surface protector overlies a portion of said first surface protector; and, securing together said first and second surface protectors to form a permanent connection between said first and second surface protectors and to form a dust-proof connection between said first and second surface protectors.

3. The method as defined in claim 2, wherein said second surface protector includes a second adhesive strip positioned at or adjacent to a perimeter of said second surface protector, said second adhesive strip having a top adhesive surface, said second adhesive strip preapplied to said second surface protector, said second adhesive strip including a removable top protective release liner that, when removed, exposes said top adhesive surface of said second adhesive strip; and further including the steps of:

at least partially removing said top protective release liner from said second adhesive strip to at least partially expose said top adhesive surface of said second adhesive strip prior to said step of securing together said first and second surface protectors, and wherein said second adhesive strip forms a permanent bond between said bottom surface of said second surface protector and said top surface of said first surface protector.

4. A method for providing temporary protection to at least a portion of a top surface of a walkable surface, wherein the method comprises:

providing a first surface protector formed of a first single sheet of bendable water-resistant material and an applied first adhesive strip; said first single sheet formed of paperboard or fiberboard; said first single sheet having a perimeter edge, a top surface, and a bottom surface; said perimeter edge formed of a front edge, a back edge, a first side edge, and a second side edge; said first adhesive strip attached to said bottom surface of said first single sheet; said first adhesive strip having a top adhesive surface; said first adhesive strip running parallel to said first side edge and said second side edge; said first adhesive strip positioned closer to said second side edge than to said first side edge; said first adhesive strip including a removable top protective release liner that, when removed, exposes said top adhesive surface of said first adhesive strip;

placing said first surface protector on said walkable surface such that i) at least a portion of said bottom surface of said first surface protector is positioned over said top surface of said walkable surface, and ii) said first adhesive strip is positioned over said top surface of said walkable surface;

removing said removable top protective release liner to expose said top adhesive surface of said first adhesive strip; and, securing said top adhesive surface of said first adhesive strip to said top surface of said walkable surface to thereby secure said first surface protector to said top surface of said walkable surface.

5. The method as defined in claim 4, further including the steps of:

providing a second surface protector, said second surface protector having a top surface and a bottom surface;

positioning said second surface protector on at least a portion of said walkable surface such that a portion of said bottom surface of said second surface protector overlies a portion of said first surface protector; and, securing together said first and second surface protectors to form a permanent connection between said first and second surface protectors and to form a dust-proof connection between said first and second surface protectors.

6. The method as defined in claim 5, wherein said second surface protector includes a second adhesive strip positioned at or adjacent to said perimeter of said second surface protector, said second adhesive strip having a top adhesive surface, said second adhesive strip preapplied to said second surface protector, said second adhesive strip including a removable top protective release liner that, when removed, exposes said top adhesive surface of said second adhesive strip; and further including the steps of:

at least partially removing said top protective release liner from said second adhesive strip to at least partially expose said top adhesive surface of said second adhesive strip prior to said step of securing together said first and second surface protectors, and wherein said second adhesive strip forms a permanent bond between said bottom surface of said second surface protector and said top surface of said first surface protector.

* * * * *